Jan. 26, 1965 P. L. GRAFSTEIN 3,167,379
CONTINUOUS FACSIMILE RECORDERS
Filed June 19, 1961
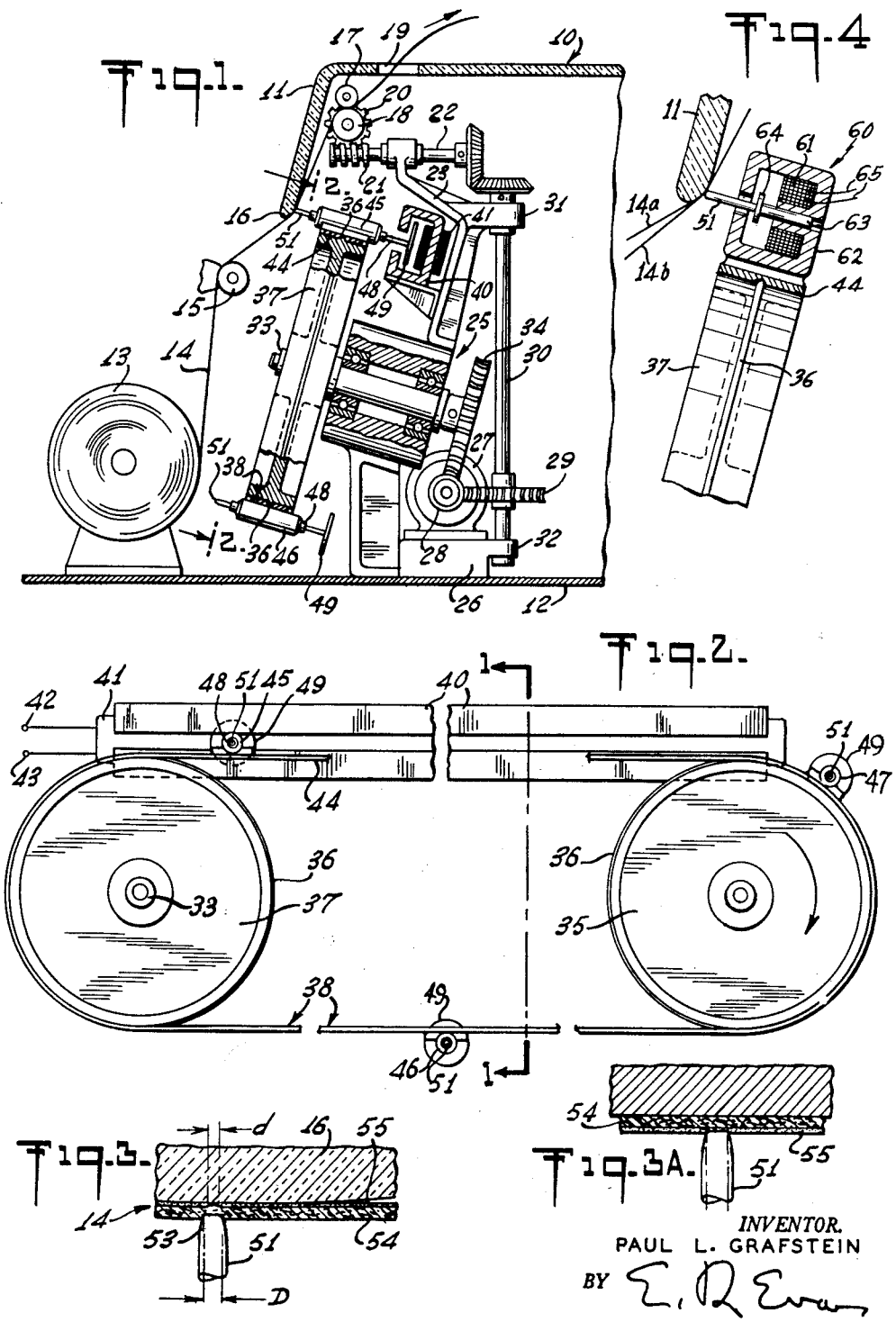
INVENTOR.
PAUL L. GRAFSTEIN
BY
ATTORNEY

3,167,379
CONTINUOUS FACSIMILE RECORDERS
Paul L. Grafstein, Brooklyn, N.Y., assignor to
Litton Systems, Inc., Beverly Hills, Calif.
Filed June 19, 1961, Ser. No. 117,913
2 Claims. (Cl. 346—79)

This invention relates to electric recorders of the stylus type, and more particularly to continuous or web type facsimile recorders where the recording stylus transverses the width of the recording web in the recording process.

A principal object of the invention is to provide, in a recorder employing pressure-sensitive means for making a record, an improved signal-recording mechanism for actuating the movable stylus or pressure marking mechanism.

Another object of the invention is to provide a fixed or stationary electromagnet arrangement for actuating the recording mechanism in a recorder of this type.

Still another object of the invention is to provide an improved stylus actuating mechanism in a recorder of the type where the stylus assembly is carried on a traveling band for the transverse or scanning movement across a recording blank.

A feature of the invention relates to a novel recorder for pressure-sensitive recording where the recording element has extensive movement, as in recording wide copy.

Another feature of the invention relates to a novel method and arrangement for making copies that may be duplicated for example, by the contact processes using sensitized papers, such as the blueprint, "Ozalid" or diazotype process.

Other features and objects of the invention will become apparent from consideration of the following detailed description and the accompanying drawings, wherein:

FIG. 1 is an elevational sectional view of a recorder according to the invention with a part of the enclosing casing broken away; FIG. 2 is a sectional view of FIG. 1 taken along the line 2—2 thereof; FIGS. 3 and 3A are magnified views of a detail; and FIG. 4 is a fragmentary view of a modified stylus assembly.

Referring to the drawings, for purposes of illustration the invention is shown as embodied in a recorder the general features of which form the subject matter of the prior application of Earl P. Nelson, Ser. No. 100,978, filed April 5, 1961, now abandoned, the disclosure of which is incorporated herein by reference.

The present invention relates to a recording stylus assembly which is employed for recording on a pressure-sensitive medium or for so-called carbon paper recording. The invention disclosed and claimed in said prior Nelson application, in its principal aspect, relates to means for recording on pressure-sensitive paper with a pressure stylus or marking point of any suitable character which engages the back (underside) or uncoated surface of the paper. This construction has the advantage that the recording mechanism is concealed behind the recording paper, thus providing a compact construction and one in which the marking point or stylus member does not pick up particles of the coating material in the recording process. Furthermore as pointed out in said prior application, the recorder may be designed so that the recording trace is visible at once, since it is not obscured by the recording device. As shown, the recording assembly embodying the present invention may be employed in a recorder of this type but it is not limited to this kind of recorder.

Referring to the embodiment of FIGS. 1 to 3, the recorder comprises an enclosing casing 10, part of which is broken away to show the internal mechanism. The casing may be of any suitable material, but at least its upper front wall 11 is formed of a transparent material, such as glass or plastic. Suitably fastened to the bottom 12 of the casing 10 is a paper supply roll 13 from which the pressure-sensitive paper web or blank 14 is unrolled and passes around an idler or guide roll 15, whereby the paper 14 is held in positive but non-marking and light contact against the rounded edge 16 of the panel 11. Thence the paper passes between rollers 17 and 18 and out through a slot 19 in the top of the casing 10. The roller 17 may be an idler roller holding the paper against the driven feed roll 18. The roll 18 is driven through a worm wheel 20 and worm gear 21 which is attached to shaft 22. The shaft 22 is supported for rotation in a bearing bracket 23 which, in turn, is attached to the outer stationary member of a ball bearing assembly 25. Also anchored to a pedestal 26 fastened to the base 12 is a suitable electric motor 27 whose shaft carries a worm gear 28 in mesh with a worm wheel 29. The worm wheel 29 is pinned to a shaft 30 supported for rotation in extensions 31, 32 of the bracket 23 and the pedestal 26, respectively.

The inner member of the ball bearing assembly 25 is fastened to the shaft 33 which is inclined at an angle as shown, and fastened to one end of shaft 33 is a worm wheel 34 which meshes with the worm gear 28. A driving pulley or wheel 37 is pinned or otherwise fastened to the shaft 33, said pulley having a rib 36 around its periphery. An idler pulley 35 is mounted on the base 12 in spaced relation to the driving pulley 37 and is similar to said driving pulley. An endless metal carrier band 38 surrounds both pulleys and this band has on its inner surface a small continuous groove which fits the ribs 36 on the pulleys 35 and 37. In this manner, the band is maintained in exact alinement. For a description of the detailed construction of such pulley and band assembly, reference may be had to the U.S. Letters Patent Nos. 2,643,173, 2,643,174 and 2,717,822, granted to Austin G. Cooley.

In accordance with the present invention, a fixed magnetizable core 40 is provided on the bracket 23 which extends across the machine the full width of the transverse area to be scanned on the blank 14, adjacent the carrier band 38. A signal-energized winding 41 is wound on this core 40 and is connected to a pair of terminals 42, 43 for connection to any source of electric signals to be recorded, such as for example, the output of any well known facsimile amplifier (not shown).

It should be noted that the electromagnet is mounted so that it is parallel and in alignment with the upper span 44 of the band 38. Bearing members 45, 46 and 47 are attached to the band 38, said members being spaced along the band a distance corresponding to the length of the maximum transverse scanning line on the blank 14. A rod or stylus member 48 is slidably mounted in each bearing member, each of said rods 48 carrying at one end a circular soft iron disc or armature plate 49, and at the other end, a projecting recording stylus 51. When the winding 41 is energized by the signal current, the magnetic force causes the armature 49 to be drawn toward the inner faces of the salient poles of the electromagnet core 40. This causes the tip of the recording stylus 51 to make a recording dot or trace on the blank 14 which is visible on the front or coated side thereof.

As shown in the magnified sectional view of FIG. 3, each impact stylus 51 has a contact tip 53 whose effective pressure area on the paper backing 54 of the blank 14 may, for example, be approximately 1 to 2 one-hundredths of an inch in diameter, as indicated by the dimension "D." In practicing the invention, the blank 14 may consist of a paper sheet 54 having one face provided with a coating 55 of a material which is responsive to localized pressure or impact thereon to produce a visible mark on the coated side of the paper at the point of impact. Such sheets or recording blanks are generally known in the facsimile art as pressure-responsive blanks, and that term as used here is intended to cover not only the coated paper blank but any blank which by virtue of its composition, coating, impregnation, extrusion or other treatment during manufacture, undergoes a locally visible charge or mark at the particular area to which impact or pressure is applied by the stylus. In general, such blanks have a backing of paper or similar material provided with a coating which is directly struck by the recording stylus. The physical effect of the impact is generally a darkening in appearance at the impacted area, but the recording affect may also appear as a change in thickness, smoothness, light transmission, or other visible property depending upon the pressure-responsive material that is employed in the film or sheet itself or on the backing. Furthermore the visible marking affect may be produced by any one of a number of physical or chemical processes or any combination thereof which are initiated by the recording impact of the stylus on the blank. On the other hand, the recording mechanism embodying the present invention may also be used in the regular way in which the pressure stylus engages the face or pressure-sensitive side of the blank, as shown in FIG. 3A. In other words, while as shown in FIGS. 1 and 3, the recording pressure is transmitted through the backing sheet to the pressure-sensitive material on the opposite face of the sheet, which surface is in smooth flat contact with a suitable platen, the stylus recording mechanism of the present invention may be employed with the reverse construction.

As shown in FIG. 3, the pressure applied on the backside of the sheet by the impact stylus is so confined laterally as to produce a smaller sharply defined trace of width "d" on the front of the sheet which is immediately visible through the transparent plate 11.

It will be evident that in accordance with the invention, a single stationary electromagnet 40, 41 is provided to actuate the operative one of the stylus assemblies carried by the band 38; i.e., the one located on the span 44 of the band 38. Even though the width of the recording sheet is comparatively large, the improved construction provides a simple precision means for supporting and actuating the respective pressure-responsive styli where each stylus is mounted in a movable support or journal accurately positioned on the supporting band. The separate stationary magnet has the advantage that it is fixed in position and does not need to be carried by the band itself. This provides a simple rugged construction which does not need any adjustment, and thus the mechanism requires a minimum of maintenance in actual service.

FIG. 4 illustrates a modification employing a similar pulley and band assembly but in this case, each impact stylus is operated by its own individual magnet. In this modification, the belt 38 carries a magnet assembly 60 for actuating each stylus member 51. The electromagnet 60 comprises a coil or winding 61 to which the signal currents are applied and a magnetizable cup-shaped shell or core 62 provided with a bore at the rear to receive the shank 63 of the plunger which carries the stylus 51. An armature disc or plate 64 is secured to the reciprocable plunger and is adapted to be attracted by the energization of the electromagnet 60 when current is applied to the coil 61. The usual brushes and stationary contact segments (not shown) are provided to conduct the signal current to the windings 61 of the respective electromagnets as each reaches the position where the stylus 51 engages the recording sheet. In a preferred form of the invention, two sheets 14a and 14b of recording material may be utilized. The sheet 14a may, for example, be transparentized or treated paper which, after being recorded upon, may be used for making duplicate copies by the diazo or blueprint process. For this purpose the second sheet 14b may be carbon paper or similar transfer paper whereby the engagement of the stylus 51 causes a transfer or deposit of marking material on the sheet 14a of transparentized or treated paper. In this manner, an opaque recording is made upon the sheet 14a which, if desired, may be used to make duplicate copies. Instead of the reverse recording shown, in this case also the pressure stylus 51 may be arranged to act upon the front of the paper and in that case the carbon paper 14b is interposed or placed in front of the sheet 14a.

It will be apparent that the invention provides a simple and efficient arrangement for recording by a pressure or impact recording device on pressure-sensitive paper in a continuous web machine. One major problem in machines of this character is the necessity for maintaining a precise positioning and traverse of the recording elements. The mounting of the recording stylus upon the traveling band as shown, and rigidly attached to said band, overcomes this problem in a simple and effective manner. However the mounting and drive construction for the respective styli may be modified in accordance with the described principles of the invention, and the specific design of the magnetic circuit may be changed in accordance with known design principles. As pointed out above, various changes and modifications may be made in the embodiments of the invention disclosed and described in detail without departing from the spirit and scope thereof.

What is claimed is:

1. Apparatus for recording electric signals comprising means for supporting and feeding a recording blank in the form of a continuous web, a movable carrier band having a span adjacent the recording area on said recording blank, a plurality of impact styli carried by said movable band to traverse said recording area in succession across the web and signal-responsive means for actuating said styli to apply pressure in localized areas and thereby record on said recording blank, said last-mentioned means comprising a magnetizable armature attached to each stylus and stationary electromagnetic means for moving said armatures to actuate said styli into marking contact with said blank in response to applied signals, said stationary electromagnetic means comprising a rectilinear magnetizable core member provided with opposed salient pole pieces between which said impact styli move in traversing said recording area, the opposed faces of said pole pieces extending parallel to and closely spaced from the rectilinear path of movement of said armatures.

2. In a facsimile recorder having means to support and feed a recording web of pressure-sensitive material, in combination, a stylus carrier band, a plurality of pressure-marking styli carried on said band, each of said styli having a shank portion provided with a magnetizable armature disc, means for driving said band to propel said styli successively in a rectilinear path across the recording area of said recording web, and a stationary electromagnet for actuating said styli against the surface of said web to record thereon, said electromagnet comprising a magnetizable core member extending across the width of said recording web and a winding on said core member, said core member being provided with spaced salient pole pieces defining a gap through which the shank portions of said styli move as the styli traverse the recording area of said recording web, said styli being positioned on said carrier band so that the armature disc on the stylus traversing the recording area bridges the gap between the pole pieces of said core member on the side opposite the surface of the recording web and is attracted towards said web when the core member is energized by signal current in said winding.

References Cited in the file of this patent
UNITED STATES PATENTS 1,255,202  Messiter _____ Feb. 5, 1918
2,785,039  Artzt _____ Mar. 12, 1957